United States Patent
Griffith

(10) Patent No.: US 9,395,000 B2
(45) Date of Patent: Jul. 19, 2016

(54) APPARATUS FOR EXCLUDING PARTICLE CONTAMINANTS FROM A GAS LIFT OFF MECHANICAL SEAL

(71) Applicant: Flowserve Management Company, Irving, TX (US)

(72) Inventor: Daryl L. Griffith, Three Rivers, MI (US)

(73) Assignee: Flowserve Management Company, Irving, TX (US)

(*) Notice: Subject to any disclaimer, the term of this patent is extended or adjusted under 35 U.S.C. 154(b) by 23 days.

(21) Appl. No.: 14/462,635

(22) Filed: Aug. 19, 2014

(65) Prior Publication Data

US 2016/0053896 A1   Feb. 25, 2016

(51) Int. Cl.
 *F16J 15/34* (2006.01)
 *F16J 15/40* (2006.01)

(52) U.S. Cl.
 CPC .............. *F16J 15/40* (2013.01); *F16J 15/3404* (2013.01); *F16J 15/3496* (2013.01)

(58) Field of Classification Search
 CPC ..... F16J 15/34; F16J 15/3404; F16J 15/3464; F16J 15/3468; F16J 15/3472; F16J 15/3476; F16J 15/348
 See application file for complete search history.

(56) References Cited

U.S. PATENT DOCUMENTS

| | | | |
|---|---|---|---|
| 2,912,265 A | 11/1959 | Brummer | |
| 4,095,807 A | 6/1978 | Jandt et al. | |
| 5,558,342 A * | 9/1996 | Sedy | F16J 15/3472 277/390 |
| 5,893,564 A | 4/1999 | Yang | |
| 6,224,060 B1 | 5/2001 | Parker et al. | |
| 6,325,380 B1 | 12/2001 | Feigl et al. | |
| 6,454,268 B1 | 9/2002 | Muraki | |
| 2007/0108704 A1* | 5/2007 | Craig | F01D 11/003 277/370 |
| 2011/0198813 A1* | 8/2011 | Takahashi | F04D 29/122 277/387 |
| 2013/0106062 A1* | 5/2013 | Hori | F16J 15/40 277/431 |
| 2014/0159316 A1* | 6/2014 | Cid | F16J 15/3452 277/375 |

FOREIGN PATENT DOCUMENTS

| | | |
|---|---|---|
| DE | 29908918 U1 | 7/1999 |
| WO | 2012079727 A1 | 6/2012 |

OTHER PUBLICATIONS

EP Search Report dated Jan. 20, 2016 of Patent Application No. EP15181393.8 filed Aug. 20, 2015.

* cited by examiner

*Primary Examiner* — Gilbert Lee
(74) *Attorney, Agent, or Firm* — Maine Cernota & Rardin

(57) ABSTRACT

A particulate exclusion mechanism for a gas lift off seal includes a band fixed to the stationary seal face and extending over the lift off region between the stationary and rotating seal faces, thereby forming an annular cavity surrounding the lift off region that traps barrier gas therein as it leaks through the lift off region and inhibits process fluid from entering the annular cavity and reaching the lift off region. The band can be made of a non-abrasive material such as PTFE or PEEK. The band can extend over the rotating seal face, and a portion of the band can be sufficiently flexible to allow the extended end of the band to constrict in diameter and contact the rotating seal face if the process pressure exceeds the barrier gas pressure. The extended end can include a thicker terminating portion that minimizes clearance with the rotating seal face.

16 Claims, 5 Drawing Sheets

APPARATUS FOR EXCLUDING PARTICLE CONTAMINANTS FROM A GAS LIFT OFF MECHANICAL SEAL

FIELD OF THE INVENTION

The invention relates to non-contact mechanical seals, and more particularly to gas lift off mechanical seals.

BACKGROUND OF THE INVENTION

With reference to FIG. 1, gas seals 100 are sometimes adapted for use on pumps, particularly to create a sealed relationship between the rotatable pump shaft 102 and the surrounding pump housing 104. The gas seal 100, which may be a single unit or, as shown in FIG. 1, a double unit, typically employs a pressurized barrier gas 106 which is supplied adjacent one periphery of the "lift off" region 114 that lies between the opposed seal faces 110, 112 (normally the outer periphery of the lift off region), while the opposite periphery of the lift off region (typically the inner diameter) is disposed in communication with the pumping (i.e. process) fluid 108. The barrier gas 106 is typically pressurized relative to the process fluid 108 and, in conjunction with pumping features such as grooves or the like provided on at least one of the opposed seal faces 110, 112, is effective for creating a gas film within the lift off region 114 between the opposed seal faces 110, 112 to maintain a small separation therebetween, while at the same time preventing the process fluid 108 from migrating between the opposed seal faces 110, 112.

In situations where the process fluid 108 is a liquid, and even in instances where the liquid has been termed cleaned, it has been observed that the liquid nevertheless can contain some quantity of small solid particles therein as contaminates. Furthermore, as the technology associated with gas seals and the life of such seals continues to improve, it has been observed that the small quantity of solids contained in "clean" liquids can create a problem with respect to the gas seal 100. In particular, it is believed that these solid particles tend to become trapped at a fairly high level of concentration in the liquid which gains entry into the lift off region 114 between the opposed seal faces 110, 112, typically from the inner periphery of the lift off region 114, and these solids tend to cause erosion or wear of one of the seal members adjacent said periphery of the lift off region 114.

This situation is made worse if for some reason the process fluid pressure should temporarily exceed the barrier gas pressure, due for example to a failure of the barrier gas pressurizing source, thereby causing the process fluid to tend to migrate into the lift off region 114.

One approach to excluding process fluids and contaminants from lift off mechanical seals is to provide a restrictive bushing and a positive-pressure clean fluid from an external source. However, this clean fluid and means of introduction into the seal can be costly and labor intensive to correctly install, and can consume considerable axial space in the seal chamber of a pump. In addition, many processes are averse to allowing dilution of pump process fluids with a clean external fluid.

Another approach is to provide a bushing with complex shapes that are configured to induce fluid flow patterns that direct contaminants in the process fluid away from the mechanical seal(s). Once again, such complex bushings can be expensive to manufacture and labor intensive to correctly install, and can consume considerable axial space in the seal chamber of a pump.

In addition, many mechanisms designed to exclude particulate contaminates from gas seals only work in cylindrical bore seal chambers, and will not function correctly if the bore or throat of the pump has been fouled by corrosion, erosion, or accumulated process solids.

What is needed, therefore, is a particulate exclusion mechanism for inhibiting particulate contaminates from reaching the lift off region of a lift off gas seal, where the particulate exclusion mechanism is inexpensive, easy to install and align, consumes very little axial space, and is not restricted to cylindrical bore seal chambers.

SUMMARY OF THE INVENTION

A particulate exclusion mechanism is disclosed that inhibits particulate contaminates in a process fluid from approaching the lift off region of a lift off gas seal. The mechanism is inexpensive, easy to install and align, consumes very little axial space, and is not restricted to cylindrical bore seal chambers.

Specifically, the particulate exclusion mechanism disclosed herein is a band surrounding and fixed to the stationary seal face of a lift off seal, and extending in close proximity over the lift off region between the seal faces and, in embodiments, also over at least a portion of the rotatable seal face. The band thereby forms a small annular cavity surrounding and directly above the lift off region, and in some embodiments also surrounding and above a portion of the rotatable seal face. This annular cavity helps to limit barrier gas leakage, and also serves to collect and retain the barrier gas as it slowly leaks through the lift off region from an adjacent barrier gas region. Embodiments include a thicker end region of the band that terminates the annular cavity and provides minimal clearance with the rotating seal periphery, thereby further enhancing containment of leaked barrier gas in the annular cavity and exclusion of process fluid therefrom.

During normal operation, the barrier gas region is pressurized with barrier gas from an external source to a pressure that is greater than the process fluid pressure in the pump. Any leakage of barrier gas therefore occurs from the higher pressure barrier gas region to the lower pressure process fluid.

As the barrier gas leakage collects in the annular cavity, its pressure eventually exceeds the process fluid pressure, thereby inhibiting inflow of the process fluid, and any contaminants it may contain, into the annular cavity. In this manner, the particle contaminants are inhibited from entering the annular cavity and from approaching the lift off region of the seal, thus preventing potentially damaging three body abrasions at these critical seal surfaces.

In embodiments, the seal is configured such that the barrier gas region is adjacent to the inner diameter of the lift off region and the process fluid is in communication with the outer diameter of the lift off region, so that centrifugal forces do not tend to drive process fluids and particulate contaminants into the lift off region between the seal faces.

In various embodiments, the band is constructed of an abrasion resistant material such as polytetrafluoroethylene (PTFE) or polyether ether ketone (PEEK). In some embodiments, the band includes a "snap" feature, such as a tab, on its inside diameter that engages with a complimentary snap feature, such as a groove, on the outside diameter of the stationary seal face. Engagement of these snap features thereby locates and maintains the band in a desired position relative to the stationary seal face, both axially and/or circumferentially.

In embodiments, at least a portion of the band is thin enough to allow the portion of the band extending over the rotating face to constrict inward, and thereby contact the rotating seal face, if the process fluid pressure exceeds the barrier gas pressure by more than a specified amount. This can help to exclude process fluids and any particulate contaminants contained therein from the lift off region if, for some reason, the process fluid pressure should temporarily exceed the barrier gas pressure, due for example to a failure of the barrier gas pressurizing source.

One general aspect of the present invention is a lift off seal including a particulate exclusion mechanism. The lift off seal includes a stationary seal face having a substantially cylindrical outer periphery, the stationary seal face terminating at one end in a stationary sealing surface, a rotating seal face having a substantially cylindrical outer periphery, the rotating seal face terminating at one end in a rotating sealing surface, the stationary and rotating sealing surfaces being closely adjacent to each other so as to form a lift off region therebetween, a gas barrier region configured to contain pressurized barrier gas, the gas barrier region being in fluid communication with an inner periphery of the lift off region, so that pressurized barrier gas can flow from the barrier gas region into the lift off region, an outer periphery of the lift off region being in fluid communication with a process fluid, and a band rotationally fixed to the outer periphery of the stationary seal face, said band extending axially at least over the outer periphery of the lift off region and forming an annular cavity surrounding the outer periphery of the lift off region.

Embodiments further include a band snap feature located in an inner surface of the band and configured for engagement with a complimentary seal face snap feature included on the outer periphery of the stationary seal face, engagement therebetween being able to maintain the band in a desired position relative to the stationary seal face at least one of axially and circumferentially.

In some embodiments, the band is constructed of an abrasion-resistant material. In some of these embodiments, the abrasion-resistant material is polytetrafluoroethylene (PTFE). In other of these embodiments, the abrasion-resistant material is polyether ether ketone (PEEK).

In various embodiments, the band includes an extended section that extends beyond the lift off region and over at least a portion of the outer periphery of the rotating seal face. In some of these embodiments, at least a portion of the band is sufficiently thin to enable the extended section to constrict in diameter and contact the outer periphery of the rotating seal face if a pressure of the process fluid exceeds a pressure of the barrier gas by a specified amount. And in other of these embodiments, the extended section of the band further includes a terminating region that is smaller in inner diameter than an outer boundary of the annular cavity.

Another general aspect of the present invention is a particulate exclusion mechanism configured for use with a lift off seal that includes a stationary seal face having a substantially cylindrical outer periphery, the stationary seal face terminating at one end in a stationary sealing surface, a rotating seal face having a substantially cylindrical outer periphery, the rotating seal face terminating at one end in a rotating sealing surface, the stationary and rotating sealing surfaces being closely adjacent to each other so as to form a lift off region therebetween, and a gas barrier region configured to contain pressurized barrier gas, the gas barrier region being in fluid communication with an inner periphery of the lift off region, so that pressurized barrier gas can flow from the barrier gas region into the lift off region, an outer periphery of the lift off region being in fluid communication with a process fluid. The exclusion mechanism is a band rotationally fixable to the outer periphery of the stationary seal face, said band being configured to extend axially at least over the outer periphery of the lift off region so as to form an annular cavity surrounding the outer periphery of the lift off region.

Embodiments further include a band snap feature located on an inner surface of the band and configured for engagement with a complimentary seal face snap feature included on the outer periphery of the stationary seal face, engagement therebetween being able to maintain the band in a desired position relative to the stationary seal face at least one of axially and circumferentially.

In some embodiments, the band is constructed of an abrasion-resistant material. In some of these embodiments, the abrasion-resistant material is polytetrafluoroethylene (PTFE). In other of these embodiments, the abrasion-resistant material is polyether ether ketone (PEEK).

In various embodiments, the band includes an extended section that is configured to extend beyond the lift off region and over a portion of the outer periphery of the rotating seal face. In some of these embodiments, at least a portion of the band is sufficiently thin to enable the extended section to constrict in diameter and contact the outer periphery of the rotating seal face if a pressure of the process fluid exceeds a pressure of the barrier gas by a specified amount. And in other of these embodiments, the extended section of the band further includes a terminating region that is smaller in inner diameter than an outer boundary of the annular cavity.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

A particulate exclusion mechanism is disclosed that inhibits particulate contaminates in a process fluid from approaching the lift off region of a lift off gas seal. The mechanism is inexpensive, easy to install and align, consumes very little axial space, and is not restricted to cylindrical bore seal chambers.

Figure 1:
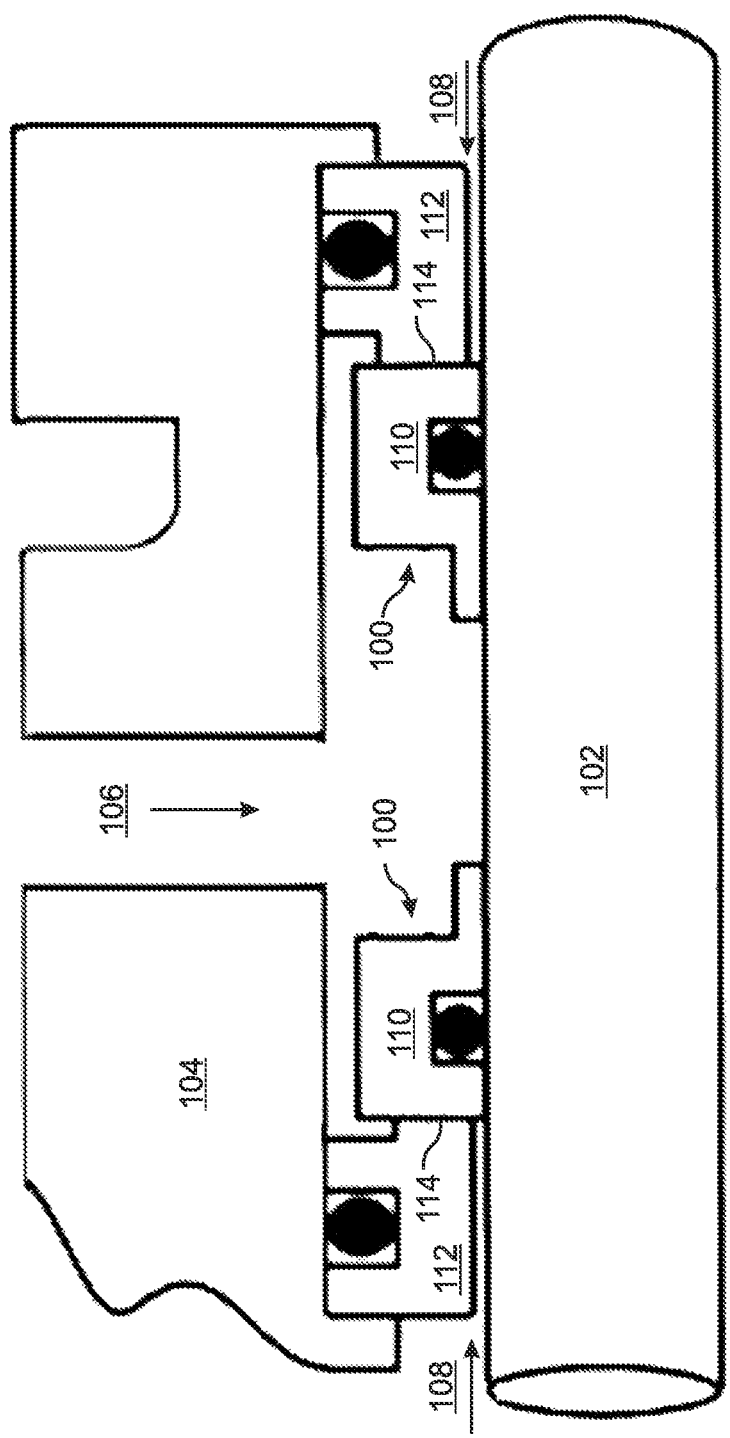
FIG. 1 is a cross sectional side view of a gas lift off seal configuration of the prior art that includes two lift off seals.
Figure 2A:
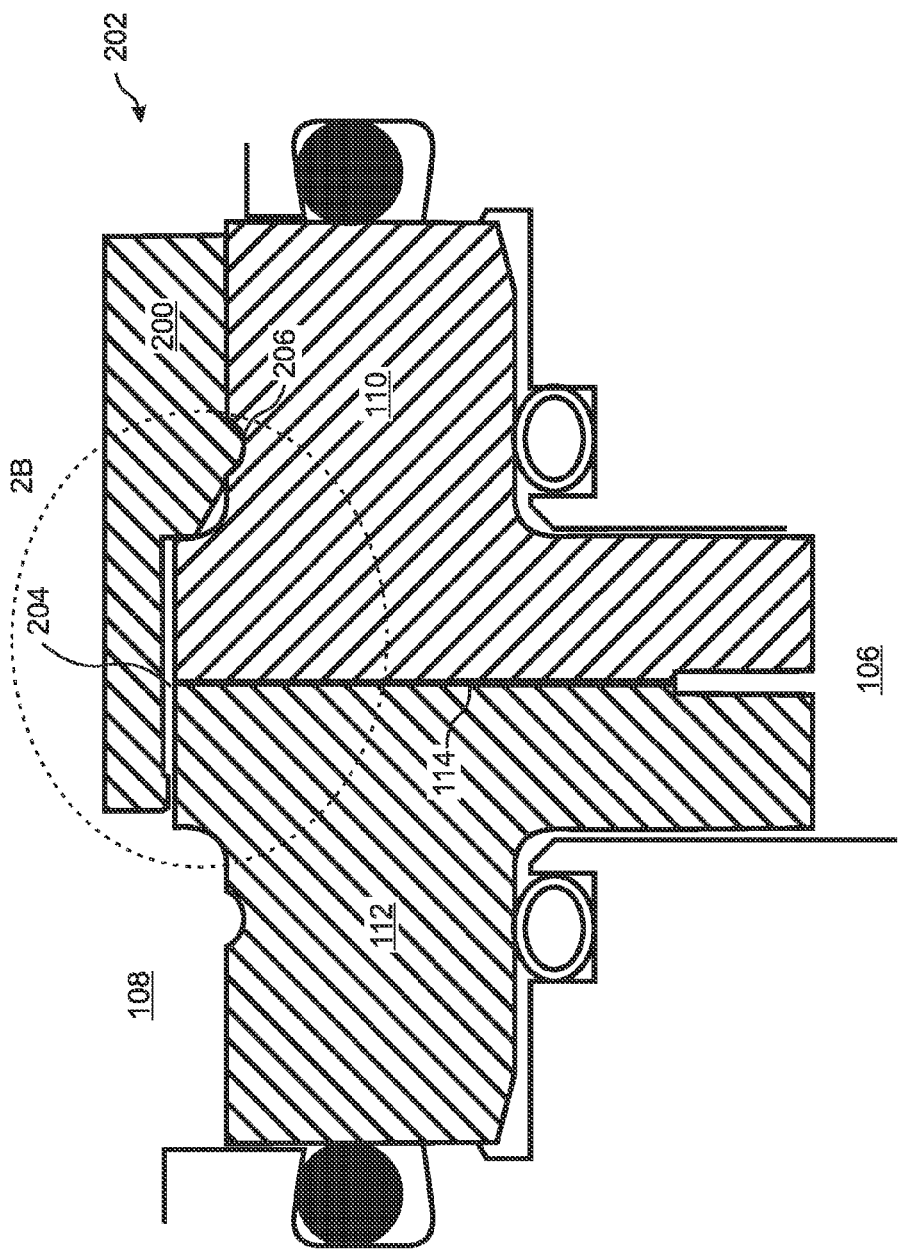
FIG. 2A is a cross sectional view drawn to scale of an embodiment of the present invention.
Figure 2B:
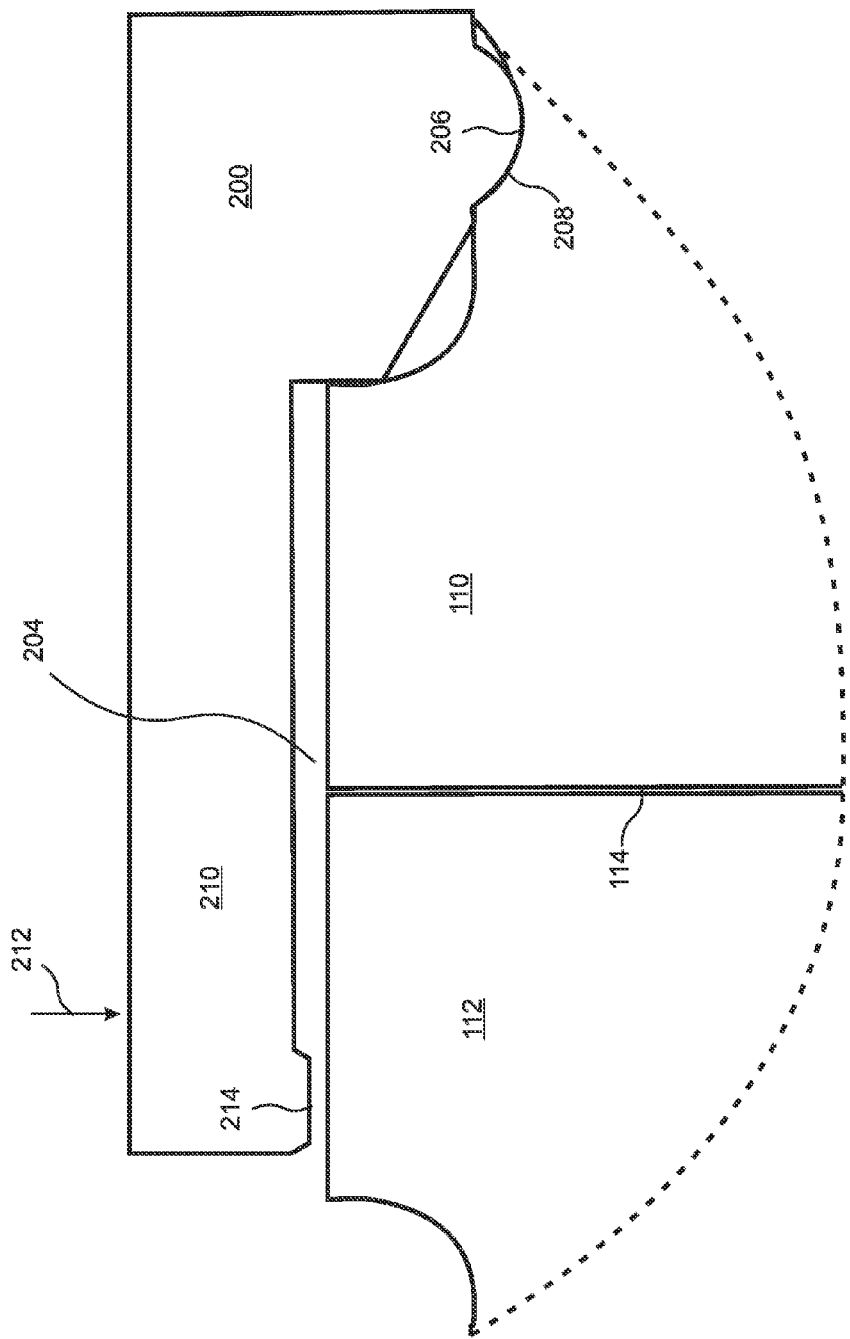
FIG. 2B is an expanded view drawn to scale of a region of FIG. 2A.

Specifically, with reference to FIGS. 2A and 2B, the particulate exclusion mechanism disclosed herein is a band 200 surrounding and fixed to the stationary seal face 110 of a lift off seal 202, and extending in close proximity over the lift off region 114 between the seal faces 110, 112 and, in embodiments, also over at least a portion of the rotatable seal face 112. The band 200 thereby forms a small annular cavity 204 surrounding and directly above the lift off region 114, and in the embodiment of FIG. 2A also surrounding and above a portion of the rotatable seal face 112. This annular cavity 204 helps to limit barrier gas leakage, and also serves to collect the barrier gas as it slowly leaks through the lift off region 114 from an adjacent barrier gas region 106. Embodiments include a thicker end region 214 of the band 200 that terminates the annular cavity 204 and provides minimal clearance with the periphery of the rotating seal 112, thereby further enhancing containment of leaked barrier gas in the annular cavity 204 and exclusion of process fluid therefrom.

During normal operation, the barrier gas region 106 is pressurized with barrier gas from an external source to a pressure that is greater than the pressure of the process fluid 108 in the pump. Any leakage of barrier gas therefore occurs from the higher pressure barrier gas region 106 to the lower pressure process fluid 108.

As the barrier gas leakage collects in the annular cavity 204, its pressure eventually exceeds the pressure of the process fluid 108, thereby inhibiting inflow of the process fluid 108, and any contaminants it may contain, into the annular cavity 204. In this manner, the particle contaminants are inhibited from entering the annular cavity 204 and from approaching the lift off region 114 of the seal, thus preventing potentially damaging three body abrasions at these critical seal surfaces.

In the embodiment of FIG. 2A, the seal 202 is configured such that the barrier gas region 106 is adjacent to the inner diameter of the lift off region 114 and the process fluid 108 is in communication with the outer diameter of the lift off region 114, so that centrifugal forces do not tend to drive process fluids and particulate contaminants into the lift off region 114 between the seal faces 110, 112. FIG. 2B is an enlarged view of the annular cavity 204 and lift off region 114 of FIG. 2A.

In various embodiments, the band 200 is constructed of an abrasion resistant material such as polytetrafluoroethylene (PTFE) or polyether ether ketone (PEEK). In some embodiments, the band includes a "snap" feature 206, such as a tab, on its inside diameter that engages with a complimentary snap feature 208, such as a groove, on the outside diameter of the stationary seal face 110. Engagement of these snap features 206, 208 thereby locates and maintains the band 200 in a desired position relative to the stationary seal face 110, both axially and/or circumferentially.

In the embodiment of FIGS. 2A and 2B, at least a portion of the band 200 is thin enough to allow the portion 210 of the band 200 extending over the rotating face to constrict inward, as indicated by the arrow 212 in FIG. 2B, and thereby contact the rotating seal face 112 if the process fluid pressure exceeds the barrier gas pressure by a specified amount. This can help to exclude process fluids and any particulate contaminants contained therein from the lift off region 114 if for some reason the process fluid pressure should temporarily exceed the barrier gas pressure, due for example to a failure of the barrier gas pressurizing source.

Figure 3:
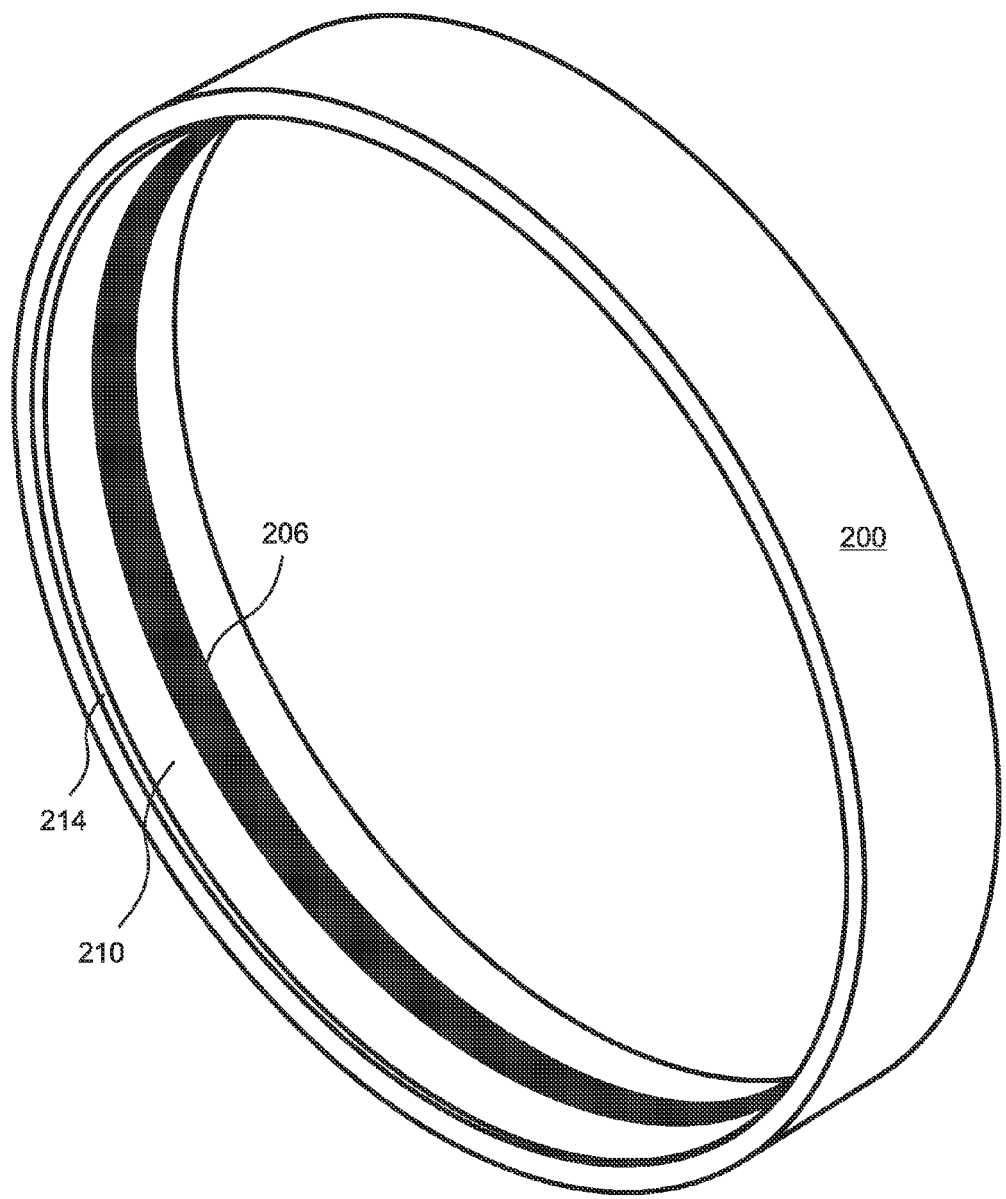
FIG. 3 is a perspective view drawn to scale of the contaminant-excluding band in the embodiment of FIG. 2A.

FIG. 3 is a perspective view of the band 200 of FIGS. 2A and 2B, showing the snap feature 206 and the end region 214. In similar embodiments, the snap feature 206 is not annular and does not extend completely around the inner surface of the band 200.

Figure 4:
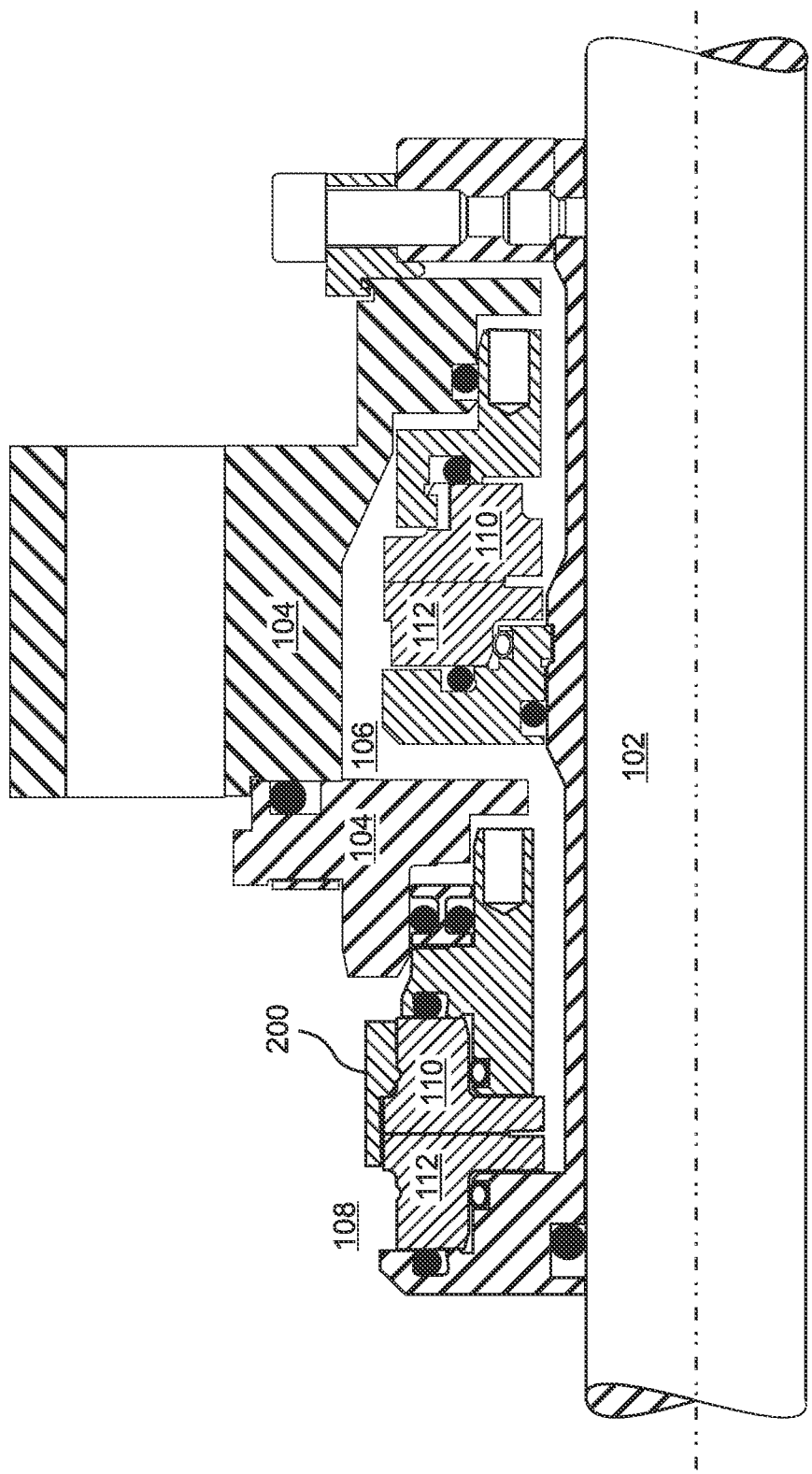
FIG. 4 is a cross sectional view drawn to scale of a dual gas lift off seal configuration that forms a seal between a rotating shaft and a housing, wherein one of the gas lift off seals includes an embodiment of the present invention.

FIG. 4 is a cross-sectional illustration of a pump that includes two barrier gas lift off seals, the first of which includes a particulate contamination excluding band 200 as described herein.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

I claim:

1. A lift off seal including a particulate exclusion band, the lift off seal comprising:
   a stationary seal face having a substantially cylindrical outer periphery, the stationary seal face terminating at one end in a stationary sealing surface;
   a rotating seal face having a substantially cylindrical outer periphery, the rotating seal face terminating at one end in a rotating sealing surface, the stationary and rotating sealing surfaces being closely adjacent to each other so as to form a lift off region therebetween;
   a gas barrier region configured to contain pressurized barrier gas, the gas barrier region being in fluid communication with an inner periphery of the lift off region, so that pressurized barrier gas can flow from the barrier gas region into the lift off region, an outer periphery of the lift off region being in fluid communication with a process fluid; and
   a particulate exclusion band rotationally fixed to the outer periphery of the stationary seal face, said band being supported entirely by said stationary seal face and extending axially at least over the outer periphery of the lift off region and forming an annular cavity surrounding the outer periphery of the lift off region.

2. The lift off seal of claim 1, further including a band snap feature located in an inner surface of the band and configured for engagement with a complimentary seal face snap feature included on the outer periphery of the stationary seal face, engagement therebetween being able to maintain the band in a desired position relative to the stationary seal face at least one of axially and circumferentially.

3. The lift off seal of claim 1, wherein the band is constructed of an abrasion-resistant material.

4. The lift off seal of claim 3, wherein the abrasion-resistant material is polytetrafluoroethylene (PTFE).

5. The lift off seal of claim 3, wherein the abrasion-resistant material is polyether ether ketone (PEEK).

6. The lift off seal of claim 1, wherein the band includes an extended section that extends beyond the lift off region and over at least a portion of the outer periphery of the rotating seal face.

7. The lift off seal of claim 6, wherein at least a portion of the band is sufficiently thin to enable the extended section to constrict in diameter and contact the outer periphery of the rotating seal face if a pressure of the process fluid exceeds a pressure of the barrier gas by a specified amount.

8. The lift off seal of claim 6, wherein the extended section of the band further includes a terminating region that is smaller in inner diameter than an outer boundary of the annular cavity.

9. A particulate exclusion mechanism configured for use with a lift off seal that includes a stationary seal face having a substantially cylindrical outer periphery, the stationary seal face terminating at one end in a stationary sealing surface, a rotating seal face having a substantially cylindrical outer periphery, the rotating seal face terminating at one end in a rotating sealing surface, the stationary and rotating sealing surfaces being closely adjacent to each other so as to form a lift off region therebetween, and a gas barrier region configured to contain pressurized barrier gas, the gas barrier region being in fluid communication with an inner periphery of the lift off region, so that pressurized barrier gas can flow from the barrier gas region into the lift off region, an outer periphery of the lift off region being in fluid communication with a process fluid, the exclusion mechanism comprising:

a band rotationally fixable to the outer periphery of the stationary seal face, said band being configured to extend axially at least over the outer periphery of the lift off region so as to form an annular cavity surrounding the outer periphery of the lift off region.

10. The exclusion mechanism of claim 9, further including a band snap feature located on an inner surface of the band and configured for engagement with a complimentary seal face snap feature included on the outer periphery of the stationary seal face, engagement therebetween being able to maintain the band in a desired position relative to the stationary seal face at least one of axially and circumferentially.

11. The exclusion mechanism of claim 9, wherein the band is constructed of an abrasion-resistant material.

12. The exclusion mechanism of claim 11, wherein the abrasion-resistant material is polytetrafluoroethylene (PTFE).

13. The exclusion mechanism of claim 11, wherein the abrasion-resistant material is polyether ether ketone (PEEK).

14. The exclusion mechanism of claim 9, wherein the band includes an extended section that is configured to extend beyond the lift off region and over a portion of the outer periphery of the rotating seal face.

15. The exclusion mechanism of claim 14, wherein at least a portion of the band is sufficiently thin to enable the extended section to constrict in diameter and contact the outer periphery of the rotating seal face if a pressure of the process fluid exceeds a pressure of the barrier gas by a specified amount.

16. The exclusion mechanism of claim 14, wherein the extended section of the band further includes a terminating region that is smaller in inner diameter than an outer boundary of the annular cavity.

\* \* \* \* \*